(12) United States Patent
Kram et al.

(10) Patent No.: US 9,663,649 B2
(45) Date of Patent: May 30, 2017

(54) STABILIZERS FOR POLYMERS CONTAINING ALIPHATICALLY-BOUND BROMINE

(71) Applicants: Shari L. Kram, Midland, MI (US); William G. Stobby, Ann Arbor, MI (US); Inken Beulich, Waedenswil (CH)

(72) Inventors: Shari L. Kram, Midland, MI (US); William G. Stobby, Ann Arbor, MI (US); Inken Beulich, Waedenswil (CH)

(73) Assignee: Dow Global Technologies LLC, Midland, MI (US)

(*) Notice: Subject to any disclaimer, the term of this patent is extended or adjusted under 35 U.S.C. 154(b) by 0 days.

(21) Appl. No.: 15/004,708

(22) Filed: Jan. 22, 2016

(65) Prior Publication Data

US 2016/0137826 A1 May 19, 2016

Related U.S. Application Data

(63) Continuation of application No. 13/131,509, filed as application No. PCT/US2009/067034 on Dec. 7, 2009, now abandoned.

(60) Provisional application No. 61/138,572, filed on Dec. 18, 2008.

(51) Int. Cl.

| | |
|---|---|
| C08K 5/02 | (2006.01) |
| C08C 19/12 | (2006.01) |
| C09K 21/08 | (2006.01) |
| C08L 25/06 | (2006.01) |
| C08L 15/02 | (2006.01) |
| C09K 21/14 | (2006.01) |
| C08J 9/00 | (2006.01) |
| C08K 5/1515 | (2006.01) |
| C08K 5/527 | (2006.01) |
| C08L 53/02 | (2006.01) |
| C08L 63/04 | (2006.01) |
| C08L 101/00 | (2006.01) |

(52) U.S. Cl.
CPC ............ *C08L 25/06* (2013.01); *C08J 9/0038* (2013.01); *C08J 9/0061* (2013.01); *C08L 15/02* (2013.01); *C09K 21/14* (2013.01); *C08J 2325/06* (2013.01); *C08J 2453/00* (2013.01); *C08J 2463/00* (2013.01); *C08K 5/1515* (2013.01); *C08K 5/527* (2013.01); *C08L 53/025* (2013.01); *C08L 63/04* (2013.01); *C08L 101/00* (2013.01)

(58) Field of Classification Search
CPC ............ C08K 5/02; C08C 19/12; C09K 21/08
See application file for complete search history.

(56) References Cited

U.S. PATENT DOCUMENTS

| | | |
|---|---|---|
| 2008/0064774 A1 | 3/2008 | Stobby |
| 2008/0287559 A1 | 11/2008 | King et al. |
| 2009/0292079 A1 | 11/2009 | Murray et al. |
| 2010/0004402 A1 | 1/2010 | King et al. |
| 2010/0168263 A1 | 7/2010 | Onishi |
| 2010/0317757 A1 | 12/2010 | King et al. |

FOREIGN PATENT DOCUMENTS

| | | |
|---|---|---|
| GB | 1444440 A | 7/1976 |
| WO | 2007058736 A | 5/2007 |
| WO | 2007/091504 A | 8/2007 |
| WO | 2008021417 A | 2/2008 |
| WO | 2008021418 A | 2/2008 |
| WO | 2009108453 A | 9/2009 |

OTHER PUBLICATIONS

Therm-Chek 832 Chemical Product. Infochem. http://www.infochems.co.kr/chemdb/product_content.asp?product_id=37147. Retrieved on Sep. 12, 2016.*

Therm-Chek 835 Chemical Product Infochem. http://www.infochems.co.kr/chemdb/product_content.asp?product_id=37148. Retrieved on Sep. 12, 2016.*

* cited by examiner

*Primary Examiner* — Matthew E Hoban
(74) *Attorney, Agent, or Firm* — Gary C Cohn PLLC

(57) ABSTRACT

Aliphatic bromine-containing polymers are stabilized using a mixture of an alkyl phosphite and an epoxy compound. This stabilizer package is very effective at preventing cross-linking reactions from occurring when the aliphatic bromine-containing polymer is subjected to high temperatures as are seen in melt processing operations. The stabilized aliphatic bromine-containing polymer is useful as a flame retardant for other polymers, notably polystyrene foam.

3 Claims, No Drawings

STABILIZERS FOR POLYMERS CONTAINING ALIPHATICALLY-BOUND BROMINE

This application claims priority from U.S. Provisional Application No. 61/138,572, filed 18 Dec. 2008.

The present invention relates to stabilized compositions that contain a brominated polymeric flame retardant.

Hexabromocyclododecane, a commonly used flame retardant for polystyrene foams, is facing regulatory pressure in various jurisdictions, in part because it is thought to bioaccumulate. Therefore, there is a desire to replace it.

Certain brominated polymers are promising candidates for replacing hexabromocyclododecane as a flame retardant in various polymer systems. These materials have molecular weights high enough that they are not expected to bioaccumulate. Various polymers that contain aliphatic carbon-carbon unsaturation can be brominated to high bromine contents, and the high bromine content makes them efficient as FR additives. Brominated polymers often possess other key characteristics, too, including compatibility with other polymers and other additives (notably foaming agents). In this respect, the brominated polymers are potentially versatile FR additives, as the polymer backbone can be selected or tailored for use with specific bulk resins. For example, polystyrene blocks can be included in a brominated butadiene polymer to improve dispersibility into a polystyrene resin. In polymer foam applications, the FR additive should not have a significant adverse effect on the foaming process or on the produced foam, particularly on foam cell formation and foam cell size.

The performance of brominated FR additives depends to a large extent on the thermal stability of the bromine-carbon bonds. These bonds must be stable enough to endure the heat conditions encountered during the various melt-processing operations that may be used, for example, to incorporate the FR additive into a bulk resin or to process the resulting blend into a useful article. The FR additive may be exposed to temperatures of 230 to 250° C. or even higher during these processing operations, and should not release a significant amount of the bromine under these conditions. At somewhat higher temperatures, typically from 300 to 400° C., the FR additive must thermally degrade to produce an active bromine-containing species which is understood to help suppress flames under fire conditions.

If a brominated FR additive is not thermally stable enough, bromine can become liberated during melt processing. This can cause several problems. One problem is that the loss of bromine during processing can lead to a loss of FR performance and to degradation of the bulk polymer that contains the brominated FR additive. Another problem is that the lost bromine can form HBr, which is an acid that can corrode processing equipment, further catalytically degrade the FR additive and present concerns about worker exposure.

A third problem has been discovered to exist when the brominated FR additive is a high molecular weight polymer. Loss of bromine can lead to the formation of intermolecular bonds between polymer chains. One possible mechanism involves the formation of aliphatic carbon-carbon unsaturation in the polymer. This unsaturation is polymerizable. Under conditions of high temperature, these unsaturated species, as well as other residual unsaturation that may be present in the polymer, can couple with other polymer molecules to form materials that have an even higher molecular weight. Because the molecular weight of the brominated polymer is high to begin with, it is not difficult to build enough molecular weight and/or crosslinking to form insoluble gels.

Gels can cause cosmetic imperfections in the product and in some cases can affect its performance. The gels can build up on the interior surfaces of the processing equipment. A special problem can occur in making foamed materials. The gelled material can interfere with the formation of the cell structure of the foam and also can have adverse affects on its physical properties. This is because the viscoelastic properties of the gelled material often are significantly different than those of the FR additive by itself.

The extent of gelling is dependent on time and on process temperatures. The amount of gelling can become quite significant, especially if the material is melt processed at temperatures above 200° C. This problem is particularly acute in thermoplastic foam extrusion processes and other processes which generate a large amount of scrap. To reduce costs, the scrap is recycled back into the process. Gelled materials and FR additive contained in the scrap are therefore recycled as well. The gels often cannot re-melt when recycled back in this way. The recycled gelled materials and the FR additive are subjected to additional exposure to high processing temperatures. This can lead to accelerated gel formation, as the gel particles may participate in additional reactions. As a result, the gelled material accumulates in the product as more and more of the scrap is recycled. It is very important to reduce this gel formation as much as possible.

Therefore, it would be desirable to provide a way in which to reduce or prevent gelling of aliphatic bromine-containing polymers and copolymers when they are exposed to elevated temperatures. This should be accomplished at low cost, using materials or methods which do not have significant adverse impact on the melt processing operation itself or the resulting product. When the product of the melt processing operation is a foamed material, the foam structure, i.e., cell size, cell size distribution and open/closed cell content should be at most minimally affected.

The present invention is in one aspect a process for producing a polymer composition, comprising melt processing a mixture containing a molten bulk polymer and an aliphatic bromine-containing polymer in the presence of (1) at least one alkyl phosphite, (2) at least one epoxy compound, or (3) both (1) and (2).

Alkyl phosphite and epoxy compounds each have been found to significantly reduce the formation of gels in the melt processing operation. In addition, these materials also improve the thermal stability of the aliphatic bromine-containing polymer, as determined according to a weight loss test as described below. The alkyl phosphite and epoxy compounds are effective at small addition levels, and so add little cost and have minimal effect on the melt processing operation or the properties of the melt-processed polymer. In the preferred process in which the melt processing operation is an extrusion foaming process, the presence of the alkyl phosphite compounds and epoxy compounds has little adverse effect on cell size and foam physical properties.

Another advantage of the invention is that the amount of epoxy compound that is needed is usually small, minimizing cost, potential adverse effects on flammability properties and potential build up of lower molecular weight materials on interior and exterior surfaces of processing equipment. Similarly, the presence of other stabilizers, such as various inorganic materials, polyhydroxyl compound and organotin stabilizers, can be eliminated or minimized. Therefore, adverse effects that are sometimes seen when these materials are used, particularly adverse effects on foam cell structure, can be avoided or reduced.

These effects are more pronounced when at least one alkyl phosphite and at least one epoxy compound are used in combination. The combination of these compounds has an additional benefit of permitting the amount of epoxy compound that is required to obtain a given level of performance to be reduced. This is desirable from a cost standpoint, and also to minimize the use of additives which may effect processing equipment. These effects are reduced if the addition level is smaller.

The reduced gel formation provided by the invention permits scrap to be recycled into the melt processing operation more readily, as gels are less apt to build up in the system. The reduced gel formation can provide cosmetic benefits, and in some cases can have a beneficial effect on the properties of the finished product.

In another aspect, this invention is also a polymer composition comprising (a) a bulk polymer, (b) an aliphatic bromine-containing polymer, and (c) at least one alkyl phosphite, at least one epoxy compound or a mixture of at least one alkyl phosphite and at least one epoxy compound, and is in still another aspect a composition comprising an aliphatic bromine-containing polymer, and at least one alkyl phosphite, at least one epoxy compound or a mixture of at least one alkyl phosphite and at least one epoxy compound.

In this invention, a bulk polymer is melt processed in the presence of an aliphatic bromine-containing polymer, an alkyl phosphite and/or an epoxy compound. The bulk polymer can be any thermoplastic polymer which is capable of being melt-processed at a temperature of 250° C. or below. The bulk polymer and the aliphatic bromine-containing polymer should be selected together so that the aliphatic bromine-containing polymer is compatible with the molten bulk polymer. An aliphatic bromine-containing polymer is considered to be compatable with the bulk polymer for purposes of this invention if it is miscible in the bulk polymer at the relative proportions that are present, or if it can be dispersed within the bulk polymer to form finely dispersed domains. These domains preferably are mainly less than 25 microns and more preferably less than 10 microns in size, although some larger domains may be present. The formation of mainly macroscopic (~100 micron or greater in scale) domains of the aliphatic bromine-containing polymer in the melt-processed product indicates such a lack of compatibility.

Thermoplastic polymers of interest as the bulk polymer include vinyl aromatic polymers (including vinyl aromatic homopolymers, vinyl aromatic copolymers, or blends of one or more vinyl aromatic homopolymers and/or vinyl aromatic copolymers), as well as other organic polymers in which the aliphatic bromine-containing polymer is soluble or can be dispersed to form domains of predominantly less than 25 μm, preferably less than 10 μm, in size. Polymers and copolymers of styrene are preferred. Most preferred are polystyrene homopolymers, and copolymers of styrene with ethylene, propylene, acrylic acid, maleic anhydride, and/or acrylonitrile. Polystyrene homopolymer is most preferred. Blends of any two or more of the foregoing polymers, or of one or more of the foregoing polymers with another resin, also can be used as the bulk polymer.

The bulk polymer should have a molecular weight high enough to allow for melt processing. Generally, a number average molecular weight of at least 10,000. For purposes of this invention, molecular weights of the bulk polymer and the aliphatic bromine-containing polymer are apparent molecular weights as measured by Gel Permeation Chromatography (GPC), relative to a polystyrene standard. GPC molecular weight determinations can be performed using an Agilent 1100 series liquid chromatograph equipped with two Polymer Laboratories PLgel 5 micrometer Mixed-C columns connected in series and an Agilent G1362A refractive index detector, or equivalent device with tetrahydrofuran (THF) or other suitable solvent flowing at a rate of 1 mL/min and heated to a temperature of 35° C. as the eluent.

The aliphatic bromine-containing polymer is an organic polymer that contains bromine atoms bonded to aliphatic carbon atoms. The aliphatic bromine-containing polymer preferably has little or no bromination on any aromatic rings that may be present. Even more preferably, the aliphatic bromine-containing polymer has little or no bromination at allylic or tertiary carbon atoms, contains few or no sites of hydrobromination (i.e. sites at which bromine and hydroxyl groups appear on adjacent carbon atoms). The presence of significant amounts of these groups tends to reduce the thermal stability of the aliphatic bromine-containing polymer.

The aliphatic bromine-containing polymer is conveniently prepared by brominating a starting polymer that contains sites of aliphatic, non-conjugated carbon-carbon unsaturation. The bromination reaction adds bromine across some or all of these unsaturation sites, binding bromine atoms to aliphatic carbon atoms and thereby producing the aliphatic bromine-containing polymer. The starting polymer preferably contains enough of those unsaturation sites such that, upon bromination, the resulting aliphatic bromine-containing polymer contains at least 20%, preferably at least 35% by weight bromine. The bromine content may be as high as 60%, 65%, 70% or more.

The starting polymer suitably has a weight average molecular weight (Mw) within a range of from 1,000 to 400,000, preferably from 2,000 to 300,000, more preferably from 5,000 to 200,000 and even more preferably from 20,000 to 200,000.

Examples of suitable starting polymers include (i) homopolymers and copolymers of a conjugated diene such as butadiene, isoprene or a 1,3-cycloaliphatic diene; (ii) a polymer or copolymer of allylmaleimide, especially a copolymer thereof with styrene; (iii) an aliphatically unsaturated polyester; (iv) an allyl ether of a novolac resin, (v) a ROMP polymer or copolymer or (vi) a poly(4-vinyl phenol allyl ether). Some of these starting polymers are described in WO 2007/019120.

Preferred among the type (i) starting polymers are homopolymers or copolymers of butadiene. Preferred among these are copolymers of butadiene and at least one vinyl aromatic monomer. Such a copolymer may be a random, block or graft copolymer. A "vinyl aromatic" monomer is an aromatic compound having a polymerizable ethylenically unsaturated group bonded directly to a carbon atom of an aromatic ring. Vinyl aromatic monomers include unsubstituted materials such as styrene and vinyl naphthalene, as well as compounds that are substituted on the ethylenically unsaturated group (such as, for example alpha-methylstyrene), and/or are ring-substituted. Ring-substituted vinyl aromatic monomers include those having halogen, alkoxyl, nitro or unsubstituted or substituted alkyl groups bonded directly to a carbon atom of an aromatic ring. Examples of such ring-substituted vinyl aromatic monomers include 2- or 4-bromostyrene, 2- or 4-chlorostyrene, 2- or 4-methoxystyrene, 2- or 4-nitrostyrene, 2- or 4-methylstyrene and 2,4-dimethylstyrene. Preferred vinyl aromatic monomers are styrene, alpha-methyl styrene, para-methyl styrene, and mixtures thereof.

A useful starting butadiene polymer contains at least 10% by weight of polymerized butadiene. Butadiene polymerizes to form two types of repeating units. One type, referred to herein as "1,2-butadiene units" takes the form

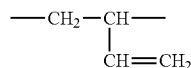

and so introduce pendant unsaturated groups to the polymer. The second type, referred to herein as "1,4-butadiene" units, takes the form —CH$_2$—CH=CH—CH$_2$— and introduce unsaturation into the main polymer chain. A starting butadiene polymer preferably contains at least some 1,2-butadiene units. Of the butadiene units in the starting butadiene polymer, at least 10%, preferably at least 15% and more preferably at least 20% and even more preferably at least 25% are 1,2-butadiene units. 1,2-butadiene units may constitute at least 50%, at least 55%, at least 60% or at least 70% of the butadiene units in the starting butadiene polymer. The proportion of 1,2-butadiene units may be in excess of 85% or even in excess of 90% of the butadiene units in the starting polymer.

Methods for preparing butadiene polymers with controlled 1,2-butadiene content are described by J. F. Henderson and M. Szwarc in *Journal of Polymer Science* (D, Macromolecular Review), Volume 3, page 317 (1968), Y. Tanaka, Y. Takeuchi, M. Kobayashi and H. Tadokoro in *J. Polym. Sci.* A-2, 9, 43-57 (1971), J. Zymona, E. Santte and H. Harwood in *Macromolecules*, 6, 129-133 (1973), and H. Ashitaka, et al., in *J. Polym. Sci., Polym. Chem.*, 21, 1853-1860 (1983).

Styrene/butadiene copolymers are especially preferred, particularly when the bulk polymer is a styrene homopolymer or copolymer. Styrene/butadiene block copolymers that are useful as the starting polymer include those available from Dexco Polymers under the trade designation VECTOR™ are suitable. Styrene/butadiene random copolymers may be prepared in accordance with the processes described by A. F. Halasa in *Polymer*, Volume 46, page 4166 (2005). Styrene/butadiene graft copolymers may be prepared in accordance with methods described by A. F. Halasa in *Journal of Polymer Science* (Polymer Chemistry Edition), Volume 14, page 497 (1976). Styrene/butadiene random and graft copolymers may also be prepared in accordance with methods described by Hsieh and Quirk in chapter 9 of *Anionic Polymerization Principles and Practical Applications*, Marcel Dekker, Inc., New York, 1996.

A starting butadiene polymer may also contain repeating units formed by polymerizing monomers other than butadiene and a vinyl aromatic monomer. Such other monomers include olefins such as ethylene and propylene, acrylate or acrylic monomers such as methyl methacrylate, methyl acrylate, acrylic acid, and the like. These monomers may be randomly polymerized with the vinyl aromatic monomer and/or butadiene, may be polymerized to form blocks, or may be grafted onto the starting butadiene copolymer.

The most preferred type of starting butadiene polymer is a block copolymer containing one or more polystyrene blocks and one or more polybutadiene blocks. Among these, diblock and triblock copolymers are especially preferred.

Starting polymer type ii) materials include copolymers of styrene and allylmaleimide. Polymers of this type can be represented by the idealized structure:

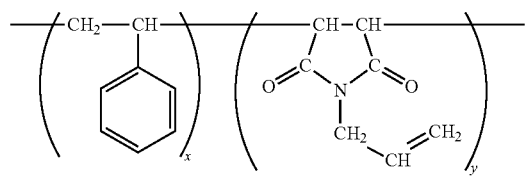

wherein x and y represent the mole fraction of the respective repeating units. In the foregoing structure, some or all of the respective styrene and allylmaleimide repeating units can alternate, and some or all of the respective styrene and 2,3-dibromopropylmaleimide repeating units can form blocks of two or more consecutive units of the same type. The mole ratio of styrene to allyl maleimide repeating units in the starting copolymer can range from 95:5 to about 40:60, but allyl maleimide levels towards the high end of this range (such as from 30 to 60 mole percent maleic anhydride) are preferred as this permits a higher bromine content to be obtained in the final product. This type of copolymer is conveniently made from a styrene-maleic anhydride copolymer. Reaction of the styrene-maleic acid copolymer with allylamine converts maleic anhydride repeating units to N-allylmaleimide repeating units. After bromination, at least a portion of the allyl maleimide repeating units are brominated to provide a brominated polymer having the structure:

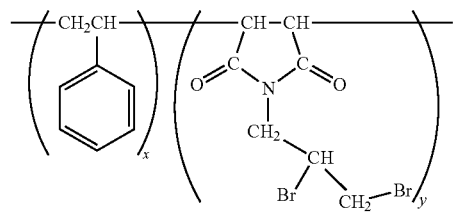

wherein x and y are as before.

Aliphatic polyesters that are useful starting unsaturated polymers include those having an -A-B— structure, in which A represents a dicarboxylic acid repeating unit and B represents a diol repeating unit. Some or all of the A and/or B units contain, prior to bromination, non-aromatic carbon-carbon unsaturation. Polyesters of this type can be prepared in a reaction of a dicarboxylic acid (or corresponding acid halide or anhydride) with a diol, at least one of which contains non-aromatic carbon-carbon unsaturation. Examples of dicarboxylic acids and corresponding anhydrides having non-aromatic carbon-carbon unsaturation include maleic acid, maleic anhydride, fumaric acid, fumaric anhydride, tetrahydrophthalic acid, tetrahydrophthalic anhydride, i.e.,

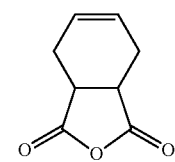 [SMILES: O=C1OC(=O)C2CC=CCC12]

and the like. Those diacids or anhydrides and/or their respective acid halides can be used to prepare a starting polyester that has A units with non-aromatic carbon-carbon unsaturation. 1,4-Dihydroxy-but-2-ene is an example of a diol having non-aromatic carbon-carbon unsaturation, and can be used to make a starting copolymer having B units that have corresponding unsaturation. Specific types of unsaturated polyesters that are useful as starting polymers include, for example, polyesters of maleic acid or a maleic acid/fumaric acid mixture, optionally one or more additional diacids, and one or more aliphatic diols; polyesters of tetrahydrophthalic anhydride with one or more aliphatic diols; polyesters of tetrahydrophthalic anhydride at least one additional diacid (or corresponding acid halide or anhydride) and one or more aliphatic diols; and polyesters of 1,4-dihydroxy-but-2-ene with one or more diacids (or corresponding acid halides or anhydrides).

Starting polymer type iv) is an allyl ester of a novolac resin. By "novolac" resin, it is meant a polymer of formaldehyde and a phenolic compound such as phenol or cresol. The phenolic compound optionally may contain 1 or 2 substituent groups on the ring (which may include bromine). Preferably, the phenolic compound contains no such substituent or only one substituent group, especially lower alkyl such as methyl, in the para-position. Starting polymers of type (iv) include those represented by the idealized structure:

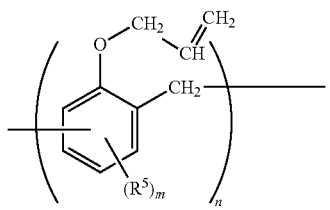

wherein $R^5$ represents a substituent group, such as alkyl or other substitution, and m is from 0 to 3. These polymers can be prepared from a novolac resin, many of which are commercially available. Allyl ether groups can be introduced by reaction of a phenolic hydroxyl group with sodium hydride to form alkoxide groups, which then react with an allyl halide such as allyl chloride or allyl bromide to produce the ether.

ROMP polymers (starting polymer type v) are homopolymers or copolymers that are formed in a ring-opening metathesis polymerization (ROMP) process from certain non-aromatic cyclic monomers that have carbon-carbon unsaturation in a ring structure. Examples of ROMP polymers that are useful as starting materials include homopolymers and copolymers of cyclopentene, cyclooctene, norbornene, cyclohexenylnorbornene, exo-norbornene dicarboxylic anhydride and dicyclopentadiene. Examples of suitable comonomers include cyclic olefins such as cyclooctene. The ROMP polymers and copolymers contain carbon-carbon double bonds in the main polymer chain.

Starting polymers of type (vi) as well as methods for brominating these polymers are described in WO 2007/019120.

The aliphatic bromine-containing polymer can be prepared from any of the aforementioned starting polymers or other polymers that contain aliphatic carbon-carbon unsaturation by adding bromine across the aliphatic carbon-carbon unsaturation. The bromination may be performed using a direct bromination process, in which e.g., the starting butadiene polymer is brominated with elemental bromine as described in WO 2008/021418. An aliphatic alcohol may be present during the bromination reaction, also as described in WO 2008/021418. Residual bromine and other by-products can be removed from the resulting aliphatic bromine-containing polymer solution, by extraction, washing, or other useful methods.

Alternatively, the aliphatic bromine-containing polymer may be obtained by brominating the starting polymer with a quaternary ammonium tribromide as described, for example, in WO 2008/021417. In a preferred such process, the starting polymer is contacted with the quaternary ammonium tribromide under conditions such that they react to produce a solution of the aliphatic bromine-containing polymer and a quaternary ammonium monobromide byproduct. The quaternary ammonium monobromide is preferably extracted with an aqueous phase containing a reducing agent to remove the quaternary ammonium monobromide stream from the brominated polymer.

It is preferred to brominate at least 60, 70, 75, 80 or 85% of the aliphatic carbon-carbon unsaturation sites contained in the starting polymer. Generally, higher bromination rates are preferred, as this reduces the number of residual sites of aliphatic carbon-carbon unsaturation in the polymer, and thus reduces the chances of gel formation when the aliphatic bromine-containing polymer undergoes thermal processing. Therefore, it is more preferred to brominate at least 90% or at least 95% of the sites of aliphatic carbon-carbon unsaturation. Up to 100% of the aliphatic carbon-carbon unsaturation sites may be brominated. A practical upper limit is generally up to 98% or up to 99%.

The aliphatic bromine-containing polymer is useful as an FR additive for a bulk polymer. Preferably, enough of the aliphatic bromine-containing polymer is present in a blend with the bulk polymer to provide the blend with a bromine content within a range of from 0.1 percent by weight to 25 percent by weight, based upon blend weight. A preferred bromine concentration in the blend (provided by the FR additive) is from 0.25 to 10 percent by weight, a more preferred amount is from 0.5 to 5 weight percent, and a still more preferred amount is from 1 to 3 weight percent. The amount of aliphatic bromine-containing polymer that is needed to provide a given bromine content to the blend will of course depend on its bromine content. In general, however, as little as about 0.15 parts by weight of the aliphatic bromine-containing polymer can be provided per 100 parts by weight bulk resin (pphr). At least 0.4 pphr or at least 0.8 pphr of the aliphatic bromine-containing polymer can be provided. Up to 100 pphr of the aliphatic bromine-containing polymer can be present in the blend, but a more preferred maximum amount is 50 pphr, a more preferred maximum amount is 20 pphr and a still more preferred maximum amount is 10 pphr or even 7.5 pphr.

In some embodiments, the blend contains at least one alkyl phosphite compound. Suitable alkyl phosphites are described in "Plastic Additive Handbook", edited by H. Zweifel, 5$^{th}$ Ed., p. 441 (2001). The alkyl phosphite compound contains at least one

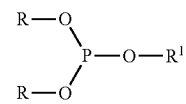

group, in which each R group is an unsubstituted or substituted alkyl group. The two R groups together may form a divalent group, which may be substituted, that bonds to the adjacent —O— atoms through an aliphatic carbon to form a ring structure that includes the —O—P—O— linkage. The R groups may be linear or branched. The carbon atom on the R groups that is adjacent to and bonded to the —O— atom is preferably a methylene (—CH$_2$—) carbon. Substituent groups on the R groups may be, for example, aryl, cycloalkyl,

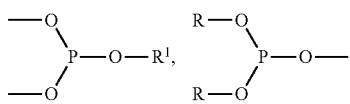

or an inert substituent. The $R^1$ group in the foregoing structures may be another R group, or an aryl or substituted aryl group.

A preferred type of $R^1$ group is an aryl group that is substituted with at least one branched alkyl group that contains a tertiary carbon atom. The branched alkyl group that contains a tertiary carbon atom may be further substituted with one or more aryl groups. Another preferred type of $R^1$ group is an alkyl group, which may be branched or linear, having from 2 to 30, preferably from 8 to 20, carbon atoms. Examples of suitable $R^1$ groups include dodecyl, tetradecyl, hexadecyl, octadecyl, 2,4-di-(t-butyl)-phenyl,

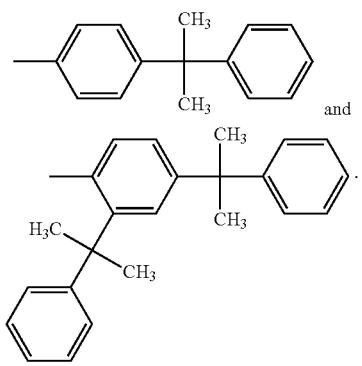

A preferred alkyl phosphite is a pentaerythritol diphosphite compound. These materials have the structure

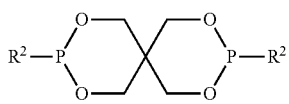

wherein $R^2$ is an unsubstituted or substituted, linear or branched, alkyl group, an aryl group or a substituted aryl group.

Specific examples of preferred alkyl phosphites include bis (2,4-dicumylphenyl)pentaerythritol diphosphite, distearylpentaerythritol diphosphite and di (2,4-di-(t-butyl)phenyl)pentaerythritol diphosphite. These are commercially available as Doverphos™ S-9228 (Dover Chemical Corporation), Doverphos™ S-682 (Dover Chemical Corporation) and Irgafos™ 126 (Ciba Specialty Chemicals).

The alkyl phosphite compound preferably is soluble in the aliphatic bromine-containing polymer to the extent of at least 10, preferably at least 20, and more preferably to at least 40, parts of alkyl phosphite compound per 100 parts by weight of the aliphatic bromine-containing polymer.

The alkyl phosphite compound is suitably present (if used) in an amount of from about 1 to about 40 parts, preferably from about 1 to about 30 parts and more preferably from about 1 to about 20 parts by weight per 100 parts by weight of the aliphatic bromine-containing compound. A blend of an alkyl phosphite with the aliphatic bromine-containing compound and the bulk polymer will generally contain at least 0.0015, preferably at least 0.0025, more preferably at least 0.005 and still more preferably 0.01 parts by weight of the alkyl phosphite per 100 parts by weight of the bulk polymer (pphr). Such a blend may contain as much as 40 pphr of the alkyl phosphite compound, but preferably the alkyl phosphite is not present in an amount greater than 20 pphr, more preferably not greater than 8 pphr, still more preferably not greater than 4 pphr and even more preferably not greater than 2 pphr.

In other embodiments, an epoxy compound is present in the blend. The epoxy compound contains on average at least one and preferably two or more epoxide groups per molecule. The epoxy compound preferably has an equivalent weight per epoxide group of no more than 2000, preferably no more than 1000 and even more preferably no more than 500. The molecular weight of the epoxy compound is at least 1000 in preferred embodiments. The epoxy compound may be brominated. A variety of commercially available epoxy resins are suitable. These may be based, for example, on a bisphenol compound, such as various diglycidyl ethers of bisphenol A. They may be based on a brominated bisphenol compound. The epoxy compound may be an epoxy novolac resin, or an epoxy cresol novolac resin. The epoxy compound may be an entirely aliphatic material, such as a diglycidyl ether of a polyether diol or an epoxidized vegetable oil. Examples of commercially available epoxy compounds that are useful herein include F2200HM and F2001 (from ICL Industrial Products), DEN 439 (from The Dow Chemical Company), Araldite ECN-1273 and ECN-1280 (from Huntsman Advanced Materials Americas, Inc.), and Plaschek 775 (from Ferro Chemical Co.).

The epoxy compound is suitably present (if used) in an amount of from about 1 to about 40, preferably from about 1 to about 20 parts by weight per 100 parts by weight of the aliphatic bromine-containing compound. A blend of an epoxy compound with the aliphatic bromine-containing compound and the bulk polymer will generally contain at least 0.0015, preferably at least 0.0025, more preferably at least 0.005 and still more preferably 0.01 parts by weight of the epoxy compound per 100 parts by weight of the bulk polymer (pphr). Such a blend may contain as much as 40 pphr of the epoxy compound, but preferably the epoxy compound is not present in an amount greater than 20 pphr, more preferably not greater than 8 pphr, still more preferably not greater than 4 pphr and even more preferably not greater than 2 pphr.

It is preferred that both the alkyl phosphite and the epoxy compound are present in the blend. In such a case, the alkyl phosphite compound and the epoxy compound are each present in an amount of from 1 to 40 or from 1 to 20 parts by weight per 100 parts by weight of the aliphatic bromine-containing polymer. The blend in such cases preferably contains from 0.0015 to 20, especially from 0.005 to 2 pphr of the epoxy compound and from 0.0015 to 20, preferably from 0.005 to 2 pphr, and more preferably from 0.01 to 1.2 pphr of the alkyl phosphite compound.

Other stabilizers and/or acid scavengers can be present, in addition to the alkyl phosphite and the epoxy compound. Examples of such materials include, for example, inorganic materials such as tetrasodium pyrophosphate, hydrocalumite, hydrotalcite and hydrotalcite-like clays; polyhydroxyl compounds having a molecular weight of 1000 or below, such as pentaerythritol, dipentaerythritol, glycerol, xylitol, sorbitol or mannitol, or partial esters thereof; and organotin stabilizers which may be allylophilic and/or dieneophilic. The organotin compounds include, for example, alkyl tin thioglycolates, alkyl tin mercaptopropionates, alkyl tin mercaptides, alkyl tin maleates and alkyl tin (alkylmaleates), wherein the alkyls are selected from methyl, butyl and octyl. Suitable organotin compounds are available commercially from Ferro Corporation (i.e., Thermchek™ 832, Thermchek™ 835), and Baerlocher GmbH (i.e., Baerostab™ OM 36, Baerostab™ M25, Baerstab™ MSO, Baerostab™ M63, Baerostab™ OM 710S).

It is generally preferable to use no greater than about 0.5 pphr, in the aggregate, of such inorganic materials, polyhydroxyl compound and organotin stabilizers, as these materials tend to plasticize the polymer and/or interfere with cell structure if used in too great a quantity. In particular, the amount of organotin stabilizer is preferably no greater than 0.5 pphr, and if present, preferably is present at a level of from 0.1 to 0.4 pphr. In some embodiments, these materials are absent from the composition.

A mixture of the bulk polymer and the aliphatic bromine-containing polymer is melt processed in the presence of the alkyl phosphite and/or the epoxy compound. Other, optional ingredients may be present as necessary or desired for the particular melt processing operation.

Melt processing, for purposes of this invention, involves creating a melt of the bulk polymer and the aliphatic bromine-containing polymer, forming the melt, and then cooling the melt to solidify it and form an article. Various melt processing operations are within the scope of this invention, such as extrusion, injection molding, compression molding, casting, and the like. The melt processing operation of most interest is extrusion foaming. In each case, the melt processing operation can be conducted in any convenient manner. Apart from the presence of the aliphatic bromine-containing polymer, alkyl phosphite and/or epoxy compound, the melt processing operations may be entirely conventional.

Other additives which may be present during the melt processing operation include, for example, lubricants such as barium stearate or zinc stearate; UV stabilizers, pigments, nucleating agents, plasticizers, FR synergists, IR blockers, and the like.

Extrusion foaming is performed by forming a pressurized melt that contains the bulk polymer, the aliphatic bromine-containing polymer, a blowing agent, the alkyl phosphite and/or the epoxy compound and other additives such as may be useful. Once the raw materials have been mixed and the polymers melted, the resulting gel is forced through an opening into a zone of lower pressure, where the blowing agent expands and the polymer solidifies to form a foam. The extruded foam can take the form of a sheet (having a thickness of up to inch (12 mm)), plank or boardstock (having a thickness of from inch (12 mm) to 12 inches (30 cm) or more), or other convenient shape. The foam can be extruded to form coalesced strand foam if desired.

The various raw materials can be fed into the processing equipment individually, or in various combinations. The alkyl phosphite and/or epoxy resin can be preblended with, for example, the aliphatic bromine-containing polymer, the bulk polymer, or both. Similarly, the aliphatic bromine-containing polymer can be introduced as a separate component, or premixed in some way with the bulk polymer. A premix can be in the form of a dry blend of particles of the bulk polymer and particles of the aliphatic bromine-containing polymer. Alternatively, or in addition, the bulk polymer and aliphatic bromine-containing polymer can be melt-blended prior to the melt processing operation, and the molten mixture or particles of the blend can be introduced into the melt processing operation. It is generally preferred to introduce the blowing agent as a separate stream after the polymeric materials have been melted.

The blowing agent in an extrusion foaming process can be an exothermic (chemical) type or an endothermic (physical) type. Physical blowing agents such as carbon dioxide, various hydrocarbons, hydrofluorocarbons, water, alcohols, ethers and hydrochlorofluorocarbons are especially suitable.

Melt processing operations tend to produce a certain amount of scrap material. This is especially true for extrusion foaming operations, due to the production of out-of-specification foam, especially during startups and process upsets, and because a certain amount of fabrication is often performed after the foam is made. When possible, it is desired to recycle the scrap material back into the process to reduce raw material losses and so improve process economics. However, the scrap material cannot be recycled if it contains significant amounts of gels, or if it forms significant amount of gels when it is recycled through the process.

Gels are masses of polymeric material which, due to crosslinking, are no longer thermoplastic and are not evenly dispersible or deformable in the molten bulk polymer or the aliphatic bromine-containing polymer. The aliphatic bromine-containing polymer is somewhat susceptible to gel formation, mainly because it may contain residual aliphatic carbon-carbon double bonds, or/and can eliminate HBr during the melt processing operation to generate aliphatic carbon-carbon double bonds. The carbon-carbon double bonds represent sites which can engage in crosslinking reactions to form higher molecular weight species and gels.

When scrap is recycled through the process, specific molecules of the aliphatic bromine-containing polymer can pass through the melt processing operation multiple times. The more times an aliphatic bromine-containing polymer passes through the melt processing step, the greater chance it has to crosslink and form gels.

An advantage of this invention is that the alkyl phosphite and the epoxy compound are each effective in preventing the aliphatic bromine-containing polymer from forming gels during melt processing. The combination of the alkyl phosphite and the epoxy compound generally performs especially well. This greatly facilitates the use of the aliphatic bromine-containing polymer in melt processing operations, notably extrusion foaming operations, in which scrap material from the process is recycled through the melt processing operation.

The article produced in the melt processing operation can be used in the same manner as similar articles made in other melt processing operations. When the article is a foam, the foam preferably has a density of up to 80 kg/m$^3$, more preferably up to 64 kg/m$^3$ and even more preferably up to 48 kg/m$^3$. Foam that is used as thermal insulation is preferably in the form of boardstock having a density of from 24 to 48 kg/m$^3$. Billet foam preferably has a density of from 24 to 64 kg/m$^3$, more preferably from 28 to 48 kg/m$^3$. The foams preferably have an average cell size in the range of from 0.1 mm to 4.0 mm, especially from 0.1 to 0.8 mm, per ASTM D3576. The foam may be predominantly closed-celled, i.e., may contain 30% or less, preferably 10% or less and even more preferably 5% or less of open cells, per ASTM D6226-05. More open-celled foams also may be produced in accordance with the invention.

Boardstock foams made in accordance with the invention are useful as building foam insulation, as part of roof or wall assemblies. Other foams made in accordance with the invention can be used as decorative billet, pipe insulation and in molded concrete foundation applications.

The following examples are provided to illustrate the invention, but not to limit the scope thereof. All parts and percentages are by weight unless otherwise indicated.

EXAMPLES 1-4

Screen experiments are done to evaluate the ability of various stabilizers to prevent thermally-induced gelling in a brominated butadiene polymer. The brominated butadiene polymer in the screening experiments is a styrene/butadiene/styrene triblock polymer containing 60% by weight butadiene prior to bromination. This starting polymer is brominated using elemental bromine as the brominating agent as described in WO2008/021418, and the resulting brominated material has a bromine content of 62% by weight. Three percent of the aliphatic carbon-carbon double bonds in the starting polymer remain after the bromination. 3.5% of the carbon-bromine C—Br bonds are to allylic or tertiary carbon atoms, which are less thermally stable than the other C—Br bonds in the structure.

In each screening experiment, the brominated butadiene is melt-blended with a stabilizer in the amount shown in Table 1 below. The blended material is ground in a mortar and pestle and then is immersed in methylene chloride at a proportion of 1 g of the blend per 10 mL of methylene chloride. A film of this blend is cast and dried in a vacuum oven at 30° C. The film sample in each case is equilibrated at 30° C. under nitrogen for 5 minutes, and then heated to 180° C. under nitrogen at the rate of 20° C./minute on a thermogravimetric analyzer (TGA). The samples are maintained at 180° C. for 20 minutes and then cooled to 30° C. at the rate of 50° C./minute, all under nitrogen. The sample is then placed in 2 mL of methylene chloride and inspected visually to determine whether the brominated butadiene polymer dissolves. The presence of undissolved and/or gelled material indicates that cross-linking has occurred under the conditions of the heating regimen, and so indicates the effectiveness of the various stabilizers tested to prevent thermally-induced crosslinking.

In addition, the 5% weight loss temperature of the heat-treated product is evaluated using thermogravimetric analysis. 10 milligrams of the polymer blend is analyzed using a TA Instruments model Hi-Res TGA 2950 or equivalent device, with a 60 milliliters per minute (mL/min) flow of gaseous nitrogen and a heating rate of 10° C./min over a range of from room temperature (nominally 25° C.) to 600° C. The mass lost by the sample is monitored during the heating step, and the temperature at which the sample has lost 5% of its weight at 100° C. (after i.e., after volatiles have been driven off) is designated the 5% weight loss temperature (5% WLT).

The various stabilizers that are evaluated, the amount of stabilizer used in each case, the solubility after thermal aging and the 5% WLT are as reported in Table 1.

TABLE 1

| Stabilizer type | Amount, parts/100 parts resin | 5% WLT | Soluble after Aging? |
|---|---|---|---|
| None | 0 | 195 | No |
| di-(2,4-di-(t-butyl)phenyl) pentaerythritol diphosphite[1] | 4 | 243 | Yes |
| distearylpentaerythritol diphosphite[2] | 8 | 241 | Yes |
| (2,4-dicumylphenyl) pentaerythritol diphosphite[3] | 8 | 246 | Yes |
| Epoxy cresol novolac resin | 14 | 237 | No |
| Epoxidized soybean oil | 14 | 218 | No |
| Brominated epoxy resin | 14 | 225 | No |

TABLE 1-continued

| Stabilizer type | Amount, parts/100 parts resin | 5% WLT | Soluble after Aging? |
|---|---|---|---|
| Ester-modified sulfide[4] | 8 | 210 | No |
| Commercial antioxidant A[5] | 8 | ND | No |
| Commerial antioxidant B[6] | 8 | 195 | No |
| Commercial antioxidant C[7] | 8 | 207 | No |
| Commercial Antioxidant D[8] | 8 | 200 | No |
| Commercial organotin stabilizer A[9] | 8 | 226 | No |
| Dioctyl tin maleate | 8 | 233 | No |
| BHT | 8 | ND | No |
| Commercial organotin stabilizer B[10] | 8 | ND | No |
| Tris (2,4-di-tert-butylphenyl)phosphite | 8 | 202 | No |

[1]Irganox ™ 126, from Ciba, CAS No. 26741-53-7.
[2]Doverphos ™ S682, from Dover Chemical Corporation.
[3]Doverphos ™ S9228 from Dover Chemical Corporation.
[4]Irganox ™ PS800FL8, from Ciba, CAS No. 123, 28-4.
[5]Irganox ™ 38, from Ciba, CAS No. 145650-60-8.
[6]Irganox ™ 565, from Ciba, CAS No. 991-84-4.
[7]Irganox ™ 1076, from Ciba, CAS No. 2082-79-3.
[8]Irganox ™ B215, from Ciba.
[9]Baerostab ™ 0M36, from Baerolocher GmbH.
[10]Thermchek 835 from Ferro Corporation.

On the basis of the screening experiments, di-(2,4-di-(t-butyl)phenyl) pentaerythritol diphosphite, distearylpentaerythritol diphosphite and (2,4-dicumylphenyl) pentaerythritol diphosphite are identified as materials which provide both good suppression of crosslinking in the brominated butadiene polymer as well as a significant increase in 5% WLT.

A blend of 50 grams of a commercial foam-grade polystyrene resin, 1.5 grams of the same brominated styrene/butadiene/styrene block copolymer and 0.25 grams of an epoxy cresol novolac resin is made as follows. The polystyrene resin is charged to a Haake Rheocord™ 90 with controller and mixing bowl containing roller blade mixers. The bowl is preheated to 180° C. The polystyrene is blended for 2 minutes at 40 rpm, and then the brominated copolymer and epoxy resin are added as a dry blend. Blending is continued for another 8 minutes at the same temperature and speed. The resulting blend is designated Example 1.

Examples 2-7 and Comparative Sample A are made in the same manner by varying the stabilizer package in each case. The stabilizer package in each case is as indicated in Table 2 below. Comparative Sample A contains no stabilizer package.

The amount of the brominated block copolymer that remains soluble (and thus ungelled) in each of Examples 1-7 and Comparative Sample A is estimated in the following manner. The sample is in each case dissolved in toluene and filtered, and bromine content in the both the original unfiltered and filtered solutions is determined by x-ray fluorescence, using a bench-top energy dispersive x-ray spectrometer. Calibration standards are prepared from pure samples of the brominated butadiene polymer, using the Compton peak correction method. The ratio of these measured bromine contents correlates to the percentage of cross-linked brominated butadiene polymer. The estimates in each case are as reported in Table 2. In each case, the margin of error is believed to be ±5 percentage points.

A portion of each blend is separately heated to 230° C. on a thermogravimetric analyzer, and held at that temperature. The time at which the sample exhibits a measurable weight loss is determined as an indication of the thermal stability of the blend. Results are as reported in Table 2.

TABLE 2

| Example or Comparative Sample No. | Dioctyltin maleate, pphr | di-(2,4-di-(t-butyl)phenyl) pentaerythritol diphosphite, pphr | Epoxy cresol novolac resin, pphr | % Soluble Brominated Block Copolymer[1] | 230° C. Onset Time, min.[2] |
|---|---|---|---|---|---|
| A* | 0 | 0 | 0 | 30 | 5.7 |
| 1 | 0 | 0 | 0.5 | 48 | 9.7 |
| 2 | 0 | 0 | 1.0 | 59 | 16.8 |
| 3 | 0 | 0.2 | 0.5 | 61 | 16.1 |
| 4 | 0 | 0.4 | 0.5 | 63 | 17.3 |
| 5 | 0.2 | 0 | 0.5 | 54 | 15.9 |
| 6 | 0.2 | 0.2 | 0.5 | 43 | 19.9 |
| 7 | 0.4 | 0.2 | 0.5 | 42 | 19.2 |

[1]The weight percent of the brominated butadiene block copolymer that remains ungelled after treatment at 180° C. in the Haake blender.
[2]The amount of time at 230° C. before the blend shows evidence of degradation (as weight loss).
*Not an example of this invention.

The brominated butadiene copolymer used in this set of experiments contains a somewhat high level of bromine weakly bonded to allylic or tertiary carbons. With no stabilizer package present (Comparative Sample A), the copolymer gels very significantly and begins to show thermal degradation after less than 6 minutes at 230° C. Adding an epoxy resin alone, as in Examples 1 and 2, reduces gelling and provides greater thermal stability. However, one weight percent of the epoxy resin (as in Example 2) is a somewhat high level, as the epoxy can plasticize the polystyrene when present at such a level. Accordingly, it is desired to reduce the epoxy resin loading and maintain equivalent or better results.

Example 3 shows the effect of replacing half of the epoxy resin used in Example 2 with 0.2% of the alkyl phosphite. Gelling is comparable in these two cases, and only a small loss of thermal stability is seen on the 230° C. thermal aging test.

Example 4 shows that by increasing the alkyl phosphite level to 0.4%, gelling is reduced significantly and the blend is slightly more thermally stable. Total additive level remains below that of Example 2.

Examples 5, 6 and 7 show the effect of adding a small amount of an organotin stabilizer to the blends of Examples 1 and 3. Thermal stability is improved significantly in each case. Less of the brominated butadiene remains soluble than in Examples 1 or 3, but this may be due to a change in solubility parameter caused by the presence of the organotin stabilizer, rather than an actual reduction in effectiveness of the stabilizer package. At the 0.4% level, the organotin stabilizer can begin to interfere with the cell structure of a polystyrene foam.

EXAMPLES 8-17 AND COMPARATIVE SAMPLE B

Examples 8-17 and Comparative Sample B are made in the same manner as the previous examples. The brominated butadiene polymer in this case is a styrene/butadiene/styrene triblock polymer containing 60% by weight butadiene prior to bromination. This starting polymer is brominated using a quaternary ammonium bromide as the brominating agent as described in WO2008021417. The resulting brominated material has a bromine content of 63%. The brominated butadiene polymer contains 7% residual aliphatic carbon-carbon double bonds. Fewer than 1% of the carbon-bromine bonds in this brominated polymer are at allylic or tertiary carbon atoms. The antioxidant packages used in this set of experiments are as indicated in Table 3. The amount of soluble brominated butadiene polymer in each blend and the 230° C. onset time for each blend are determined as described in the previous examples. Results are as indicated in Table 3.

TABLE 3

| Ex. or Comp. Samp. No. | di-(2,4-di-(t-butyl)phenyl) pentaerythritol diphosphite, pphr | (2,4-dicumylphenyl) pentaerythritol diphosphite, pphr | Distearyl pentaerythritol diphosphite, pphr | Epoxy cresol novolac resin, pphr | % Soluble Brominated Block Copolymer[1] | 230° C. Onset Time, min.[2] |
|---|---|---|---|---|---|---|
| B* | 0 | 0 | 0 | 0 | 58 | 7 |
| 8 | 0 | 0 | 0 | 0.5 | 87 | 10 |
| 9 | 0.4 | 0 | 0 | 0 | 83 | 10 |
| 10 | 0.8 | 0 | 0 | 0 | 90 | 11 |
| 11 | 0.4 | 0 | 0 | 0.5 | 89 | 22 |
| 12 | 0 | 0.4 | 0 | 0 | 84 | 11 |
| 13 | 0 | 0.8 | 0 | 0 | 88 | 11 |
| 14 | 0 | 0.4 | 0 | 0.5 | 91 | 27 |
| 15 | 0 | 0 | 0.4 | 0 | 88 | 12 |
| 16 | 0 | 0 | 0.8 | 0 | 89 | 11 |
| 17 | 0 | 0 | 0.4 | 0.5 | 88 | 22 |

*Not an example of the invention.

The data in Table 3 shows that each of di-(2,4-di-(t-butyl) phenyl) pentaerythritol diphosphite, (2,4-dicumylphenyl) pentaerythritol diphosphite, distearyl pentaerythritol diphosphite and the epoxy cresol novolac resin are effective in reducing gellation of the brominated butadiene polymer and in retarding the degradation of the brominated butadiene polymer. However, increasing the levels of the phosphites from 0.4 to 0.8 pphr has little additional beneficial effect. When the alkyl phosphite and epoxy cresol novolac resin are used together (as in Examples 11, 14 and 17), a very significant lengthening of the 230° C. onset time is seen.

What is claimed is:

1. An extruded polymer foam composition comprising (a) a styrene homopolymer or copolymer, (b) a brominated styrene/butadiene block copolymer in which fewer than 1% of the carbon-bromine bonds are at allylic or tertiary carbons in an amount sufficient to provide the extruded polymer foam composition with 0.5 to 5 weight-percent bromine, and (c) a mixture of at least one alkyl phosphite selected from the group consisting of bis (2,4-dicumylphenyl)pentaerythritol diphosphite, distearylpentaerythritol diphosphite and di(2,4-di-(t-butyl)phenyl)pentaerythritol diphosphite and at least one epoxy cresol novolac resin, wherein from 1 to 20 parts by weight of the alkyl phosphite are present per 100 parts by weight of the brominated styrene/butadiene block copolymer and further wherein from 1 to 20 parts by weight of the epoxy cresol novolac resin are present per 100 parts by weight of the brominated styrene/butadiene block copolymer.

2. A method for producing an extruded polymer foam composition of claim 1, comprising forming a pressurized melt of a mixture containing molten polystyrene and a brominated styrene/butadiene block copolymer in an amount sufficient to provide the extruded polymer foam composition with 0.5 to 5 weight-percent bromine in the presence of a blowing agent and a mixture of at least one alkyl phosphite selected from the group consisting of bis (2,4-dicumylphenyl)pentaerythritol diphosphite, distearylpentaerythritol diphosphite and di(2,4-di-(t-butyl)phenyl) pentaerythritol diphosphite and at least one epoxy cresol novolac resin wherein from 1 to 40 parts by weight of the alkyl phosphite are present per 100 parts by weight of the brominated styrene/butadiene block copolymer and further wherein from 1 to 40 parts by weight of the epoxy cresol novolac resin are present per 100 parts by weight of the brominated styrene/butadiene block copolymer and forcing the melt through an opening into a zone where the blowing agent expands and the polystyrene solidifies to form a foam.

3. A method for reducing gel formation in a brominated styrene-butadiene copolymer during melt processing, comprising performing the melt processing of the brominated styrene-butadiene copolymer in the presence of a mixture of at least one alkyl phosphite and at least one epoxy cresol novolac resin compound, wherein from 1 to 40 parts by weight of the alkyl phosphite are present per 100 parts by weight of the brominated styrene/butadiene block copolymer and further wherein from 1 to 40 parts by weight of the epoxy cresol novolac resin are present per 100 parts by weight of the brominated styrene/butadiene block copolymer.

* * * * *